United States Patent [19]

Enomoto et al.

[11] 4,390,504
[45] Jun. 28, 1983

[54] APPARATUS FOR PRODUCING SILICON CARBIDE CONSISTING MAINLY OF β-TYPE CRYSTAL

[75] Inventors: Ryo Enomoto, Ohgaki; Michihiro Yoshioka, Gifu; Takao Yokoyama, Ohgaki, all of Japan

[73] Assignee: Ibigawa Electric Industry Co. Ltd., Gifu, Japan

[21] Appl. No.: 316,964

[22] Filed: Oct. 30, 1981

Related U.S. Application Data

[63] Continuation of Ser. No. 119,978, Feb. 8, 1980, abandoned.

[30] Foreign Application Priority Data

Feb. 21, 1979 [JP] Japan .................................. 54-18463

[51] Int. Cl.³ .......................................... B01J 19/02
[52] U.S. Cl. ..................................... 422/166; 422/199
[58] Field of Search ............... 422/199, 164, 166, 167, 422/307, 308, 232; 423/345, 439, 440; 13/22, 25; 219/390

[56] References Cited

U.S. PATENT DOCUMENTS

| | | | |
|---|---|---|---|
| 2,178,773 | 11/1939 | Benner et al. | 423/345 |
| 2,869,990 | 1/1959 | Burgess | 423/440 |
| 3,032,398 | 5/1962 | Clair | 422/199 |
| 3,232,706 | 2/1966 | Kuhn | 423/345 |
| 3,404,210 | 10/1968 | Weber | 13/22 |
| 3,933,434 | 1/1976 | Matovich | 422/240 |

*Primary Examiner*—Hiram H. Bernstein
*Attorney, Agent, or Firm*—Parkhurst & Oliff

[57] ABSTRACT

β-type silicon carbide having exceedingly high purity is stably and continuously produced in an apparatus comprising a vertical type reaction vessel having an inlet, a preheating zone, a heating zone, a cooling zone and a closable outlet which are sequentially communicated in this order in vertical direction, and a heat insulating layer composed essentially of fine powders of graphite and carbonaceous materials arranged on at least outside of the heating zone, the heating zone of the reaction vessel being made of graphite and having a heating means to indirectly and electrically heat charged materials, the preheating zone having a horizontal cross-sectional area larger than that of the heating zone at any level above an arbitrary position of the preheating zone.

13 Claims, 5 Drawing Figures

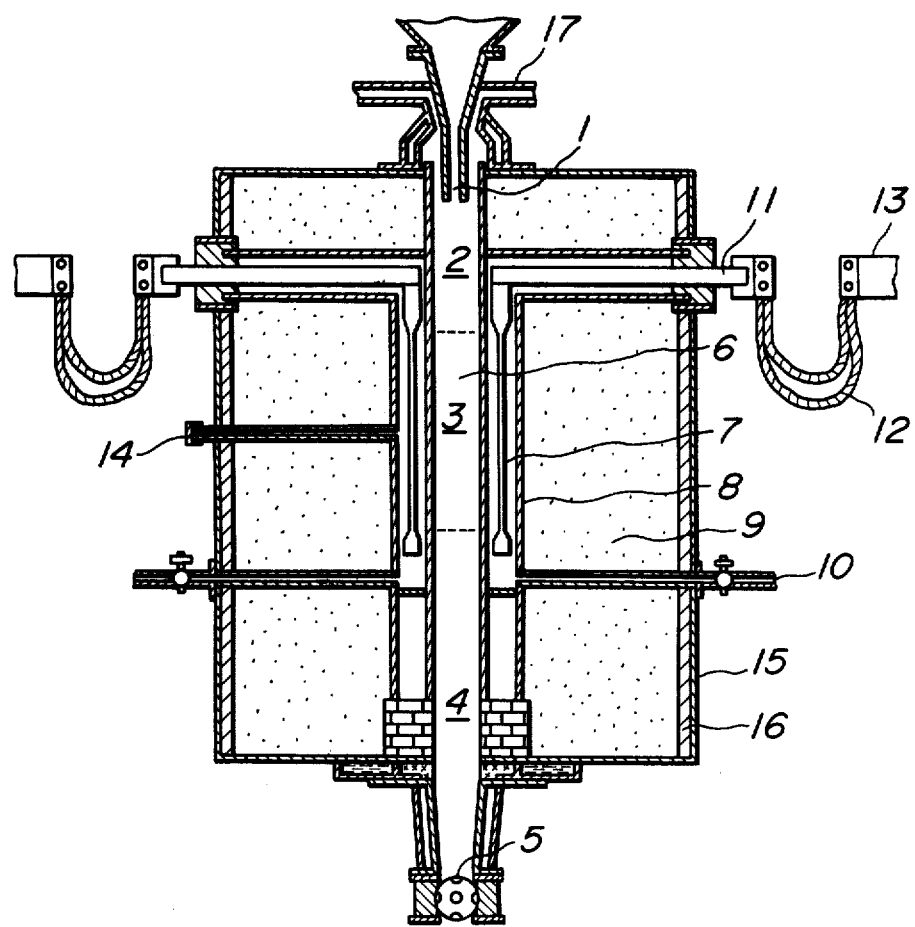

APPARATUS FOR PRODUCING SILICON CARBIDE CONSISTING MAINLY OF β-TYPE CRYSTAL

This is a continuation of application Ser. No. 119,978 filed Feb. 8, 1980, now abandoned.

BACKGROUND OF THE INVENTION

The present invention relates to an industrial apparatus for cheaply and continuously producing silicon carbide of β-type crystal of fine and high purity using silica and carbon as starting materials. Particularly, the present invention relates to an improvement of the apparatus described in our U.S. patent application Ser. No. 18,939.

A particle of β-type silicon carbide crystal has a rather roundish shape, so that particles of β-type silicon carbide crystal are suited to a fine powdery abrasive for super precise grinding which affords faster grinding speed than conventional fine powdery abrasives without incurring deep scars on surfaces of works to be abraded. They have excellent filling property and oxidation resistance resulting also from their roundish particulate shape, so that they are suited to such uses as a filler and a coating material for improving an oxidation resistance of a heating element or a refractory made of silicon carbide and the like, particularly β-type silicon carbide crystals of fine and high purity are suited to a starting material for sintered bodies such as a gas turbine element, a high temperature heat exchanger, a heat-resistant jig element, a jig element for treating melted materials, a part of high temperature furnace, a chemical equipment part and the like.

A conventional method of industrially producing the silicon carbide has been effected using a publicly known classical discontinuous Achéson type electric furnace. Thus, a sealing of the electric furnace has been difficult. Therefore, it has many environmental, labor and sanitary problems and has not been an efficient and economical method. In addition, the conventional method of using the Acheson type furnace has drawbacks that it can obtain β-type silicon carbide merely in a very small quantity as a by-product in producing α-type silicon carbide and that the β-type silicon carbide contains α-type silicon carbide and other impurities in high percentage and cannot be mass produced at high yield percentage.

There has hitherto been proposed many methods of continuously producing silicon carbide. For example, U.S. Pat. No. 2,178,773 Specification discloses a method wherein silicon carbide is continuously produced using a shaft kiln for a purpose of obtaining silicon carbide suitable for abrasives. In this method, in order to prevent a mixture of materials silica and carbon from agglomerating or solidifying in a cake shape due to melt of silica at a low temperature zone, the mixture of the materials is directly charged extremely little by little in a high temperature zone to completely react the materials in an upper part of the high temperature zone and the reacted materials are further heated to grow into large coarse crystals noticeable by a naked eye. However, this method of completing the SiC forming reaction at the high temperature zone and growing the crystals into large and coarse crystals is very difficult to practice, because the reaction products are sintered in the high temperature zone to form mutually agglomerated bodies or adhere on inner wall of the reaction vessel whereby a smooth transfer or descent thereof is disturbed. West German Pat. No. 1,186,447 discloses a method of continuously producing β-type silicon carbide in an intermediate process using a shaft kiln, for a final purpose of obtaining α-type silicon carbide. This method uses silica sand coated with carbonaceous powders as a raw material and a special rection vessel having a gas vent hole at reaction zone, in order to prevent agglomeration of a mass of the material due to melt of the coated silica sand. However, the method has not taken into consideration a behaviour of SiO gas produced at the forming reaction of silicon carbide. Thus, the SiO gas is discharged in a great quantity from the gas vent hole arranged at the reaction vessel, therefore, not only quality and yield of the reaction product are deteriorated, but also heat efficiency is extremely lowered owing to discharges of heat of formation of the SiO gas and sensible heat of CO gas. Furthermore, a long period of stable operation cannot be expected, because the gas vent hole is clogged by the deposition of the SiO gas.

As explained above, an economical and industrial method of continuously producing silicon carbide consisting of fine β-type crystal has not yet been known. However, we have proposed previously in the above U.S. patent application Ser. No. 18,939 an apparatus for producing fine silicon carbide, comprising a vertical type reaction vessel having an inlet for charging starting materials, a preheating zone, a heating zone, a cooling zone and a closable outlet for the product which are sequentially communicated in this order in vertical direction, the heating zone being made of a graphite cylinder and having an effective heating width of 0.10–0.35 m, and a means for heating the starting materials in the heating zone by an electrically indirect heating, and further comprising a heat insulating layer composed of fine powders of graphite and/or carbon and arranged on at least outside of the heating zone, whereby the materials charged from the charging inlet are preheated while descending in the preheating zone and subsequently indirectly heated and reacted with each other thus forming silicon carbide in the heating zone by the heating means while descending continuously or intermittently by their own weight and the formed silicon carbide is cooled while descending in the cooling zone and discharged from the outlet.

The above apparatus affords an extremely easy, efficient, stable and continuous operation for a long period of time when β-type silicon carbide is produced by using a carbonaceous material having a relatively good reactivity, such as anthracite or the like. However, when a carbonaceous material having an extremely low ash content, for example, oil coke or the like is used for a purpose of obtaining β-type silicon carbide containing especially little amount of impurities of a solid solution state, the carbonaceous material has poor reactivity to react with the SiO gas, so that an amount of the SiO gas to be discharged together with generated gases increases and the SiO gas deposits on inner wall surface of the preheating zone. The deposit on the inner wall surface of the preheating zone becomes a cause of an extremely undesirable phenomenon of preventing a smooth descent of the materials by their own weight, and the deposit is quite difficult to remove, so that a long period of stable and continuous operation has been difficult.

SUMMARY OF THE INVENTION

The present invention relates to an improvement of the above apparatus of our previous application, and an object of the present invention is to provide an apparatus for producing silicon carbide consisting mainly of β-type crystal, which can stably operate for a long period of time without a hindrance due to the deposit of the SiO gas of obstructing the smooth descent of the materials by their own weight in the preheating zone.

The present invention provides, for achieving the above object, an apparatus for producing silicon carbide consisting mainly of β-type crystal, comprising a vertical type reaction vessel having an inlet for charging starting materials, a preheating zone, a heating zone, a cooling zone and a closable outlet for the product which are sequentially communicated in this order in vertical direction, the heating zone being made a graphite cylinder and having a means for heating the starting materials in the heating zone by an electrically indirect heating, and a heat insulating layer composed essentially of fine powders of graphite and/or carbonaceous material and arranged on at least outside of the heating zone, characterized in that a horizontal inner cross-sectional area of the preheating zone at any level above an arbitrary position of the preheating zone is larger than a horizontal inner cross-sectional area of the heating zone.

BRIEF DESCRIPTION OF THE DRAWINGS

FIG. 5 is a diagrammatical longitudinal cross-section of the apparatus of our aforementioned U.S. application Ser. No. 18,939 used in Comparative Example which will later be described.

DETAILED EXPLANATION OF THE INVENTION

Reaction of silica with carbon to form silicon carbide is expressed generally by the following equation (1).

$$SiO_2 + 3C \rightarrow SiC + 2CO \text{ (gas)} \tag{1}$$

However, it has been known that practical main forming mechanisms are a formation of SiO gas according to the following equation (2) and a reaction of the resulting SiO gas with carbon to form silicon carbide according to the following equation (3).

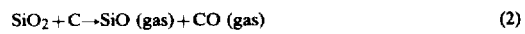
$$SiO_2 + C \rightarrow SiO \text{ (gas)} + CO \text{ (gas)} \tag{2}$$

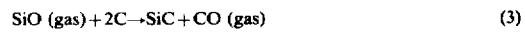
$$SiO \text{ (gas)} + 2C \rightarrow SiC + CO \text{ (gas)} \tag{3}$$

According to the apparatus of the present invention, starting materials consisting mainly of silica powders and carbon powders for producing β-type silicon carbide are charged from the material-charging inlet to an upper part of the preheating zone, preheated while descending in the preheating zone and converted to SiC according to the above equations (2) and (3) in the heating zone while descending by their own weight. Gases produced at the time of the reactions and not reacted are discharged from an upper part of the preheating zone, and the reaction product is cooled while descending in the cooling zone and discharged for recovery from the product-discharging outlet arranged at a lower part of the reaction vessel.

Figure 2:
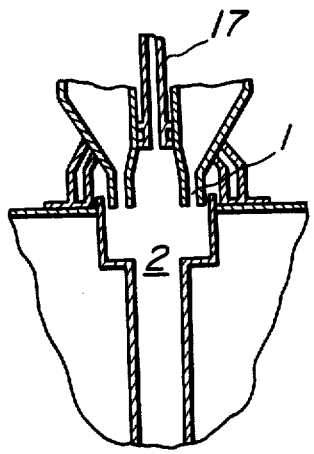
FIGS. 2–4 are diagrammatical partial longitudinal cross-sections respectively illustrating principally a preheating zone of various embodiments of the present invention.
Figure 3:
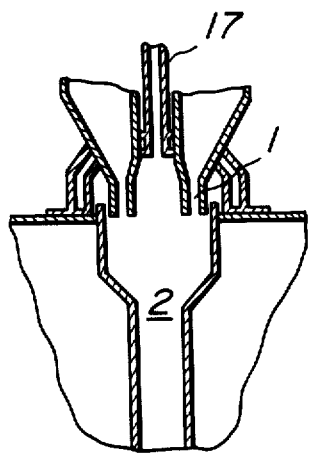
Figure 4:
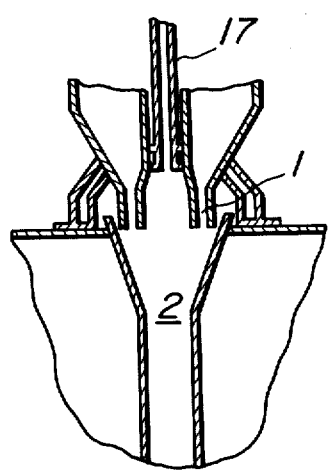

The horizontal inner cross-sectional area below the arbitrary position of the preheating zone varies stepwise and/or continuously. For instance, the horizontal inner cross-sectional area can be shaped to have a partial longitudinal cross-section as shown in FIGS. 2, 3 and 4 and can assume a circular, tetragonal or elliptical form. FIG. 2 illustrates a shape wherein an upper part of the preheating zone is enlarged stepwise. FIG. 3 illustrates a shape wherein an upper part of the preheating zone is enlarged to a funnel-like shape and a further upper part thereof has a vertical wall. FIG. 4 illustrates a shape wherein an upper part of the preheating zone is enlarged to a funnel-like shape up to its upper end. It should be noted that, in addition to the preheating zones having the longitudinal cross-sections as shown in FIGS. 2–4, any preheating zone having a larger horizontal inner cross-sectional area at at least one level of the preheating zone than that of the heating zone can prevent the hindrance by the deposit of the SiO gas of obstructing the descent of the materials by their own weight in the preheating zone.

Thus, the most important matter in the apparatus of the present invention is that a horizontal inner cross-sectional area of the preheating zone at any level above the arbitrary position of the preheating zone is so formed that it is larger than a horizontal inner cross-sectional area of the heating zone.

The apparatus for producing silicon carbide consisting mainly of β-type crystal according to the present invention has a structure to prevent issue of the gases produced from a lower part of the reaction vessel and to pass the CO gas produced at the time of forming the silicon carbide through a layer of the materials charged or filled in the preheating zone thereby to preheat the charged materials and then through an upper part of the preheating zone for discharge, as mentioned above. Therefore, among the intermediate gaseous product SiO in the forming reaction of the silicon carbide, a portion of the SiO gas which could not be converted to SiC reaches together with the rising CO gas to the preheating zone and produces an adhesive deposit at a low temperature area of the preheating zone. Therefore, when a carbonaceous material of a low ash content such as oil coke, pitch coke, etc. is used, a usage of an apparatus like the apparatus of our aforementioned U.S. patent application Ser. No. 18,939 is not preferable wherein the cylinder forming the preheating zone is constituted from a vertical wall similarly as that of the heating zone. This is because the carbonaceous material having a low ash content is poor in reactivity and hence among the SiO gas produced in the heating zone the portion of SiO gas which could not be converted to SiC is considerably increased to also increase an amount of the deposit in the preheating zone. However, because the apparatus of our aforementioned U.S. patent application Ser. No. 18,939 has a structure that the cylinder forming the preheating zone is constructed from a vertical wall similarly as that of the heating zone, the apparatus is liable to suffer from an adverse influence of the adhesive deposit of the SiO gas, and thus not only the materials are mutually adhered to form agglomerates, but also the produced gases passing through the materials-filled preheating zone are deflected and risen along an inner wall surface of the cylinder constituting the preheating zone, so that a large amount of deposits are formed and adhered on the inner wall surface to reduce the horizontal inner cross-sectional area of the cylinder forming the preheating zone, whereby the smooth descent of the materials by their own weight which is most important for producing β-type silicon carbide is considerably obstructed and a long period of stable and continuous operation of the apparatus becomes difficult.

On the contrary, according to the apparatus of the present invention, a horizontal inner cross-sectional area of the cylinder constituting the preheating zone at any level above the arbitrary position of the preheating zone is so formed that it is larger than a horizontal inner cross-sectional area of the heating zone, so that the produced gases passing through the preheating zone are dispersed above the arbitrary position and a flow rate of the produced gases passing through the preheating zone per unit horizontal inner cross-sectional area of the preheating zone is decreased, whereby the deposit from the SiO gas is dispersed and the adverse influence of the adhesive deposit over the descending property of the materials by their own weight is lessened. In addition, a major portion of the produced gases generated in the heating zone and deflected and risen along the inner wall surface of the reaction vessel rises through the filled materials layer above the arbitrary position in the preheating zone, so that an amount of the gases rising along the inner wall surface of the preheating zone is decreased to substantially eliminate the forming and adhesion of the deposit on the inner wall surface of the preheating zone. Therefore, smooth deposit of the materials by their own weight can be ensured and a long period of stable and continuous operation of the apparatus can be maintained.

It is preferable that the horizontal inner cross-sectional area of the preheating zone at any level above the arbitrary position of the preheating zone is at least about 1.4 times of the horizontal inner cross-sectional area of the heating zone. If the ratio is smaller than about 1.4, the produced gases cannot be dispersed sufficiently and the flow rate of the produced gases rising along the inner wall surface of the preheating zone cannot be decreased considerably. While, if the ratio is too large, a thermal energy dissipated from an upper part of the preheating zone becomes uneconomically large and the material carbons are likely oxidized, particularly in an apparatus for producing silicon carbide which has an open upper structure, so that most satisfactory results can be obtained when the ratio is within a range of about 2.0–20.

A height of the arbitrary position of the preheating zone is preferably not more than about 0.5 m from an upper end of the heating zone. If the height is larger than about 0.6 m, the produced gases are heat exchanged and cooled in the preheating zone at lower level than the arbitrary position, so that the unreacted or remaining SiO gas deposits already at high concentration before reaching the arbitrary position to obstruct the descent of the materials by their own weight whereby the advantageous effect which would be brought from the enlarging of the horizontal inner cross-sectional area of the preheating zone cannot be expected. Most favourable results can be obtained when the height is within a range of about 0.1–0.4 m.

DESCRIPTION OF THE PREFERRED EMBODIMENTS

Hereinafter, the present invention will be explained in more detail with reference to preferred embodiments shown in the attached drawings.

Figure 1:
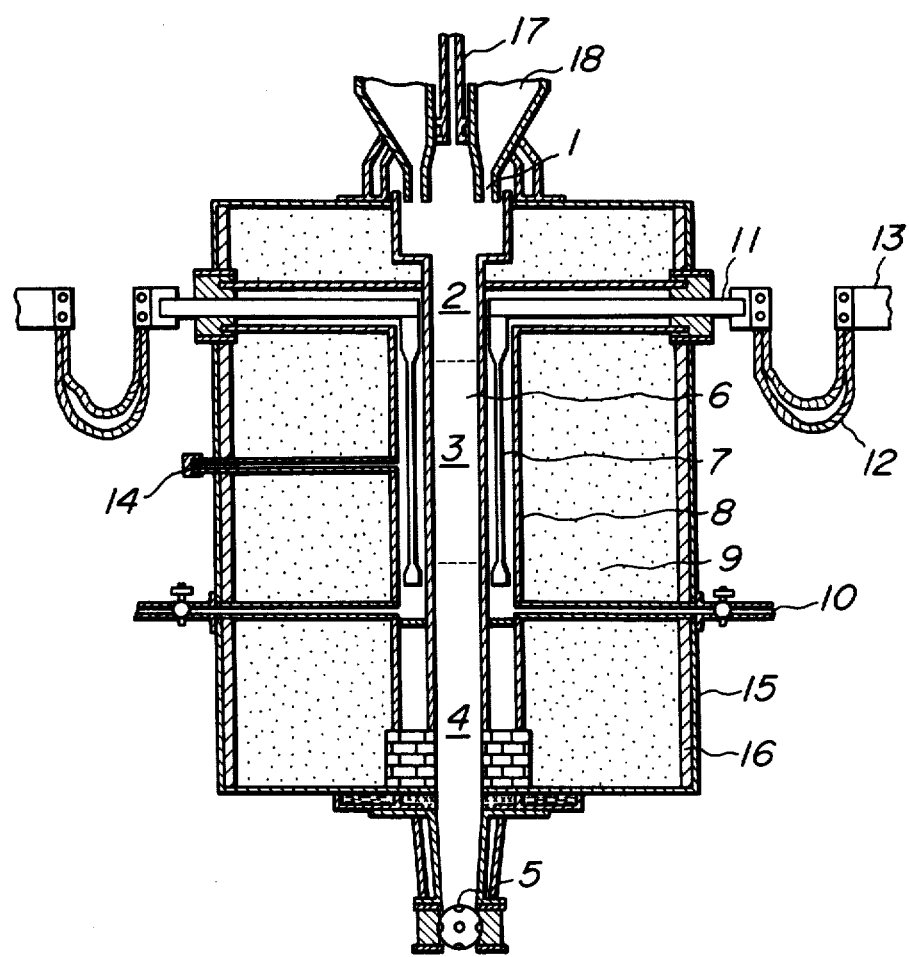
FIG. 1 is a diagrammatical longitudinal cross-section illustrating an embodiment of the apparatus according to the present invention.

Referring to FIG. 1, the apparatus of the present invention comprises an inlet 1 for charging starting materials 18, a preheating zone 2, a heating zone 3, a cooling zone 4 and a closable outlet 5 for the product which are sequentially communicated in this order in vertical direction to form a cylindrical reaction vessel 6, the heating zone 3 forming a part of the cylindrical reaction vessel 6 being made of graphite and having an electric resistive heating member 7 made of graphite and a heat reflection cylinder 8 made of graphite for indirectly and electrically heating the materials charged in the heating zone 3, and a heat insulating layer 9 composed of fine powders of carbonaceous material and/or graphite arranged on at least outside of the heating zone 3. A horizontal inner cross-sectional area of the preheating zone 2 forming a part of the reaction vessel 6 is larger at any level above an arbitrary position of the preheating zone 2 than a horizontal inner cross-sectional area of the heating zone 3. Gaseous reaction products of other gases are discharged via outlet 17.

It is essential that the cylinder constituting the heating zone 3 is made of a heat-resistant material such as graphite, because it is heated to an extremely high temperature. The cylinders constituting the preheating zone 2 and the cooling zone 4 are not necessarily so high heat-resistant material as graphite. However, lower part of the preheating zone at lower level than the arbitrary position is preferably made of graphite, since it is often exposed to relatively high temperatures. The other parts of the apparatus can be made of heat-resistant bricks or amorphous refractories. Preferably, the effective heating width in the heating zone 3 is a length of within a range of about 0.10–0.35 m. If the effective heating width is larger than about 0.35 m, differences between reaction temperatures in the horizontal heating direction of the heating zone 3 become so large that a uniform reaction product can hardly by obtained, whereas, if the effective heating width is less than about 0.10 m, the charged materials are likely to bridge, so that the smooth descent of the charged materials by their own weight becomes difficult and the production of the silicon carbide becomes so small that the apparatus can scarcely be used industrially.

The term "effective heating width" used herein means a twice of a distance between an inner wall surface of the cylinder forming the heating zone and a charged material therein positioned most distant from the inner wall surface on a same horizontal plane of the heating zone.

As the indirectly electrically heating means, such means as shown in FIG. 1 consisting of an electric resistive heating member 7 made of graphite and a heat reflection cylinder 8 made of graphite or the like, for example, is advantageously used. The heating member 7 can be any desired shape such as rod shape, U-shape, ribbon shape or other various shapes and is so arranged near around the heating zone 3 that a heat-generating portion of the heating member 7 corresponds to a vertical length of the heating zone 3 while heating the materials charged in the heating zone 3 as uniformly as possible. A vertical length of the heat-generating portion of the heating member 7 is preferably within a range of about 0.3–1.5 m. If the length of the heat-generating portion is shorter than about 0.3 m, a uniform heating of the materials can scarcely be effected and a descending speed of the charged materials has to be slowed down and the productivity is decreased in order to effect the reaction of forming silicon carbide completely. While, if the length of the heat-generating portion is longer than about 1.5 m, once produced β-type silicon carbide is further heated to a higher temperature and thus experiences crystal growth through decomposition and regeneration and converted to α-type silicon carbide which firmly adheres on the inner wall surface of the reaction vessel 6 or yields by itself an agglomerated body to render the discharge of the product considerably difficult. The heat reflection graphite cylinder 8 may form an inner wall of a chamber containing the heat insulating layer 9 as shown in FIG. 1, or an inner lining of the chamber.

The heating graphite member 7 is positioned in a space defined by the cylindrical graphite heating zone 3 and the heat reflection graphite cylinder 8. The space is filled with a non-oxidizing gas such as argon, helium, nitrogen, carbon monoxide, hydrogen or the like introduced through an inlet 10 for charging the non-oxidizing gas, whereby consumption of the heating graphite member 7 due to oxidation resulting from invasion of air in the space is prevented. The heating member 7 is connected with an electric power source (not shown) via a guide electrode 11, a flexible conductor 12 and a buss bar 13. In this way, an electric current supplied by the guide electrode 11 is changed into heat at the heat-generating portion of the heating member 7, and a portion of the heat is transmitted directly to the cylinder constituting the heating zone 3 and another portion of the heat is transmitted after reflection by the reflection graphite cylinder 8 to the cylinder constituting the heating zone 3 and indirectly heat the charged materials by passing across the cylinder heating zone 3.

When producing β-type silicon carbide by using the apparatus of the present invention and by indirectly and electrically heating the charged materials at a desired temperature, a means for measuring a temperature of the outer wall or a temperature of the vicinity of the outer wall of the cylinder forming the heating zone 3 and regulating an applying electric power can be used as a device for controlling the reaction temperature. As a means for measuring the above-mentioned temperature, use may be made of an optical pyrometer, a radiation pyrometer, a dichroism thermometer or the like through a temperature-measuring pipe 14 one end of which being closed or left open, or a thermocouple such as tungsten-iridum or the like thermocouple for high temperature use.

A heat insulating layer composed of fine powders of graphite and/or carbonaceous material is arranged at least around the heating zone 3, thereby to prevent dissipation of heat from the reaction vessel. The heat insulating layer 9 must be constituted from such a material that can withstand to a high temperature of about 2,000° C. and does not react with graphite even in contact therewith and has an excellent heat insulating property at high temperature range. Therefore, fine powders of graphite and/or carbonaceous material are preferable as the heat insulating material. As the fine powders of graphite and/or carbonaceous material, use is made of, for example, finely ground various coke, natural or artificial graphite, roasted anthracite or other fine powdery carbonaceous materials or graphite materials such as lamp black, furnace black, acetylene black or the like. Particularly, carbon black and acetylene black are advantageous in the present invention in that they have small bulk density and superior heat insulating property at high temperature range. Preferably, the heat insulating layer has a thickness of within a range of about 0.1–1.5 m in horizontal direction.

At outside of the heat insulating layer 9 is arranged an outer shell 15 which can be prepared from a steel plate or a steel plate having a lining of heat insulating bricks 16 at its interior side.

The outlet 5 for discharging the product must be a tightly closable product-discharging outlet, because of necessity of preventing an invasion of the atmosphere into the reaction vessel 6 through the outlet 5 and issue of the produced gases generated in the reaction vessel 6 to the atmosphere through the outlet 5 in case of discharging the reaction product. If the atmosphere invades into the reaction vessel 6 through the outlet 5, the reaction product is oxidized and its quality is deteriorated. While, if the produced gases issue to the atmosphere from the outlet 5, the deposition reaction of the intermediate product SiO gas contained in the product gases occurs at the cooling zone in the lower part of the reaction vessel 6. Therefore, not only the product quality is deteriorated, but also the products are agglomerated due to adhesive function of the deposit of the SiO gas and are scarcely discharged, when the issue of the produced gases is considerably large.

The outlet 5 is preferably provided with a discharging means which can easily regulate the discharge rate of the reaction product. This is because that the descending speed of the materials and the product by their own weight in the heating zone 3 can be adjusted by regulating the discharge rate of the product, and a uniform product can easily and continuously be obtained by regulating the residence time of the materials and the product in the heating zone 3 to correspond to the reaction temperature thereby to cause the charged materials in the reaction vessel to react at an optimum condition for producing the β-type silicon carbide. As the discharge means for regulating the discharge rate of the product, use is made of, for example, such device as a rotary type, a roller type, a table type, a screw type or other conventional type discharge device.

As the indirectly electrically heating means, an indirect heating means may be mentioned consisting of an induction coil which inductively heat the graphite cylinder forming the heating zone and a heat insulating layer arranged between the induction coil and the graphite cylinder, in addition to the aforemtnioned heating means consisting of an electric resistive heating graphite member 7 and a heat reflection graphite cylinder 8.

Hereinafter, a method of producing silicon carbide consisting mainly of β-type crystal using the apparatus of the present invention will be explained.

Materials consisting mainly of silica powders and carbon powders are mixed and shaped to a suitable shape and charged form the charging inlet of the reaction vessel into the preheating zone, and reacted to form SiC in the heating zone while descending by their own weight, and thereafter discharged from the product-discharging outlet, and produced gases are discharged from an upper part of the preheating zone so as to prevent deposition of SiO gas on the inner wall surface of the preheating zone thereby enabling a smooth descent of the materials by their own weight in the reaction vessel, whereby silicon carbide consisting mainly of β-type crystal can be produced.

Preferably, the starting materials used in the apparatus of the present invention are shaped to pellets having an average diameter of within a range of about 3-18 mm. This is because that the apparatus of the present invention has the structure that the horizontal inner cross-sectional area of the cylinder forming the preheating zone is narrowed at a lower part of the preheating zone, so that the charged materials form a bridge and their descent by their own weight is obstructed unless the materials have excellent flowability. If the average diameter of the pellets is smaller than about 3 mm, the materials have worse ventilation property and flowability and are liable to suffer the adverse influence of the deposit of the SiO gas. While, if the average diameter is larger than about 18 mm, an extremely prolonged time is required for completing the silicon carbide-forming reaction, so that the production operation becomes uneconomical.

It is important that the shaped materials retain their originally shaped forms even when they are exposed to a high temperature or a thermal shock. For that purpose, a carbonaceous bonding agent is advantageously used which retain its bonding power even at a high temperature range. Shaped materials wherein the carbonaceous bonding agent is used have high compression strengths and are not degraded to powders and maintain the desired forms even in a high temperature reaction zone and retain their original forms, because the carbons in the bonding agent can react with the SiO gas in the produced gases to form silicon carbide even when the shaped materials are heated to yield the reaction product. Therefore, advantageous results can be obtained that scattering of the intermediate product SiO gas from the shaped materials can be decreased and an amount of the SiO gas which can be converted to SiC in the shaped materials increases, so that an amount of the SiO gas deposited in the preheating zone can be decreased.

Illustrative advantageous carbonaceous bonding agents are coal tar, petroleum tar, wood tar, coal tar pitch, petroleum pitch, wood tar pitch, asphalt, molasses, phenol resins, ligninsulfonates and other materials having the similar effects. The carbonaceous bonding agent is preferably added to the mixture of silica powders and carbon powders in an amount of about 1.0-15.0% by weight calculated as solid relative to the mixture.

In the production method using the apparatus according to the present invention, the pelletized mixed materials consisting mainly of silica powders and carbon powders can exclusively be used. However, it is also possible to incorporate and mix in the materials an additive such as wood pieces, wood chips, charcoal grains or the like, in order to decrease the influence of the deposit and improve the descent of the materials by their own weight, when producing β-type silicon carbide by using carbonaceous material having an especially low reactivity.

In the production method using the apparatus according to the present invention, silica powders of high purity obtained by pulverizing silica stones or silica sands, carbonaceous powders obtained by pulverizing a carbonaceous material having a low ash content, and a carbonaceous bonding agent may be used as starting materials. When reciping such starting materials, it is advantageous to select a mol ratio of $C/SiO_2$ within a range of about 3.2–5.5. If the $C/SiO_2$ mol ratio is smaller than about 3.2, a proportion of SiO gas which could not be reacted or converted to SiC to the whole SiO gas produced in the heating zone increases and a smooth descent of the materials by their own weight which is most important in continuously and stably producing silicaon carbide is often obstructed because of the adhesive deposit of the unreacted SiO gas in the preheating zone. While, if the $C/SiO_2$ mol ratio is larger than about 5.5, carbon powders which do not contribute to the silicon carbide-forming reaction are heated to a high temperature, so that heat efficiency is lowered and an expense required to the carbonaceous material becomes uneconomically large.

In the production method using the apparatus according to the present invention, a carbonaceous material having a low ash content and a poor reactivity can be used. In order to achieve the usage of such material, an improvement of reactivities of carbon powders with $SiO_2$ as well as with the SiO gas by enlarging the surface area and surface activity of the carbonaceous material by finely grinding the carbonaceous material is important. Preferably, an average grain size of the carbonaceous material is not over than about 15 μ.

Because impurities contained as ash content in the carbonaceous material used in the present invention have a tendency to be incorporated as a solid solution into the product β-type silicon carbide, it is desirable to use carbon powders having a low ash content, preferably of not more than about 1%. Carbon powders satisfying the above condition, such as petroleum coke powders, pitch coke powders etc. can advantageously be used.

When effecting the SiC-forming reaction in the heating zone of the apparatus of the present invention, the reaction temperature is maintained within a range of about 1,650–2,100° C. If the reaction temperature is higher than about 2,100° C., the formed β-type silicon carbide crystals are grown and transited to α-type silicon carbide to result in a sintered mass, so that the reaction vessel is liable to be clogged and a continuous operation of the apparatus becomes difficult. While, if the reaction temperature is lower than about 1,650° C., the reaction speed becomes so extremely low that the production becomes uneconomical. The reaction temperature is substantially correlated to the outer wall temperature of the graphite cylinder constituting the heating zone. Therefore, in order to maintain the reaction temperature within a range of about 1,650–2,100° C., the outer wall temperature of the graphite cylinder constituting the heating zone is controlled within a range of about 1,750–2,350° C. This is because the reaction temperature cannot be raised more than about 1,650° C. if the outer wall temperature is lower than about 1,750° C., while the reaction temperature rises to more than about 2,100° C. if the outer wall temperature is higher than about 2,350° C.

In addition to the prevention of the flow deflection of the SiO gas on the inner wall surface in the preheating zone, preferably a level, i.e., height of the materials-filled layer above the arbitrary position of the preheating zone is maintained not over than about 0.6 m. If the production operation is effected maintaining the height at more than about 0.6 m, almost all of the SiO gas risen from the heating zone deposit on the surfaces of the materials and cannot be discharged to outside of the reaction system, so that a partial pressure of the SiO gas in the reaction vessel gradually increases and an amount of deposition of the SiO gas in the preheating zone also increases. As a result, smooth descent of the materials by their own weight is noticeably obstructed and a long period of stable and continuous operation becomes difficult. While, if the production operation is effected maintaining the height at too low level, the CO gas of high temperature is discharged without heat-exchanging sufficiently with the materials, and a thermal energy transferred from the reation vessel and dissipated in vain in the preheating zone increases, so that the heat efficiency is lowered and simultaneously an amount of the SiO gas discharged with the CO gas increases, therefore, heat loss and material loss become untolerably large and economical production of $\beta$-type silicon carbide becomes difficult. Thus, the most favourable results can be obtained by selecting the height of the materials-filled layer within a range of about 0.1–0.5 m.

The height of the materials-filled layer can be retained at a substantially constant level within the aforedescribed suitable range, or can be pulsated intermittently.

Mass speed of the CO gas passing through the materials-filled layer above the arbitrary position of the preheating zone is preferably selected to not more than about 300 kg/m$^2$·hr. If the mass speed of the CO gas is more than about 300 kg/m$_2$·hr, an amount of the deposit per unit horizontal inner cross-sectional area at the SiO deposition region in the materials-filled layer increases along with the increase of the CO gas, so that a long period of smooth descent of the materials by their own weight cannot be maintained. While, if the mass speed of the CO gas is too low, output or production of silicon carbide per unit apparatus becomes uneconomically small. Therefore, the mass speed of the CO gas is preferably selected within a range of about 20–250 kg/m$^2$·hr.

Hereinafter, the present invention will be explained in more detail with reference to a preferred Working Example in comparison with a Comparative Working Example, which, however, should not be construed in any means as limitations of the present invention.

In the Examples, all percentages are shown by weight basis unless otherwise specified.

WORKING EXAMPLE $\beta$-type silicon carbide is produced under the following conditions, using the apparatus of the present invention as shown in FIG. 1 and having detailed measures or means as shown in the following Table 1. The preheating zone of the apparatus has a whole length of 0.8 m in vertical direction, and the horizontal inner cross-sectional area at a position of 0.25 m above the lower end of the preheating zone is 2.5 times of the horizontal inner cross-sectional area of the heating zone.

TABLE 1

| | |
|---|---|
| Indirectly electrically heating means | Heating member: Graphite Reflection cylinder: Graphite |
| Product-discharging means | Rotary valve |
| Effective heating width of heating zone cylinder | 0.24 m |
| Whole vertical length of heating zone | 0.8 m |
| Whole vertical length of cooling zone | 1.0 m |
| Heat insulating material | carbon black powder |
| Thickness of heat insulating layer | 0.45 m |

Silica stone powder having an SiO$_2$ content of 99.7% and an average particle diameter of 150$\mu$, petroleum coke powders having a carbon content of 98.8% and an ash content of 0.3% and an average grain size of 12$\mu$ and pitch powders having a carbon content of 50.4% and an average grain size of 20$\mu$ are reciped to a C/SiO$_2$ mol ratio of 3.8 and a ratio of 7% of the carbonaceous materials powders to the silica stone powders, and mixed in a screw type mixer for 10 minutes. The resulting mixture is shaped to pellets having an average diameter of 10.3 mm on a pan type pelletizer and the shaped pellets are dried at a temperature of 150° C. for 1.5 hours. The dried pellets are charged in the apparatus from an upper part thereof and subjected to the SiC-forming reaction at a temperature of about 1,850° C. by indirectly and electrically heating the materials while maintaining the height of the materials-filled layer (a height from the lower end of the enlarged portion of the preheating zone to the upper surface level of the charged materials) of 0.3 m in the preheating zone and the mass speed of the CO gas within a range of 200–220 kg/m$^2$·hr and allowing the materials to descend by their own weight in the heating zone having a controlled temperature by regulating the outer wall temperature of the graphite cylinder constituting the heating zone to 2,100° C., and cooled in the cooling zone, and then continuously discharged from the outlet to obtain reaction product. The reaction product has a composition ratio of 74.6% of SiC, 2.3% of SiO$_2$ and 23.1% of free carbons after removal of impurities. The reaction product is purified so as to remove remained silica and carbons, to obtain $\beta$-type silicon carbide. The $\beta$-type silicon carbide contains 0.2–0.3% of impurities other than free silica and free carbons.

During and after a continuous 7 days operation under the above-described conditions, the descending property of the materials by their own weight is exceedingly good, so that a stable and continuous operation can be effected.

COMPARATIVE WORKING EXAMPLE

The same operation as that described in the above Working Example is effected using the production apparatus as shown in FIG. 5 having the detailed measures and means as shown in the preceding Table 1.

After 9–10 hours from initiation of the charging of the materials, a phenomenon occurs that the descent of the materials by their own weight is retarded and the continuous operation is difficult. Then, the production apparatus is overhauled and studied to find out that a deposit of the SiO gas has firmly adhered on the inner wall surface of the graphite cylinder of the preheating zone and the horizontal inner cross-sectional area of the preheating zone has been narrowed to about half as much of the original horizontal inner cross-sectional area thereof.

As apparent from the above explanations, the apparatus according to the present invention can stably and continuously produce silicon carbide consisting of $\beta$-type crystal containing an exceptionally small content of impurities as a solid solution, so that the apparatus is industrially exceedingly useful.

Although the present invention has been explained with reference to specific values and embodiments, it will of course be apparent to those skilled in the art that the present invention is not limited thereto and many variations and modifications are possible without departing from the broad aspect and scope of the present invention as defined in the appended claims.

What is claimed is:

1. An apparatus for the continuous production of silicon carbide consisting mainly of β-type crystal, the apparatus comprising a gravity-free reaction vessel having an inlet for charging starting materials by contacting said materials with effluent gases, a heating zone, a cooling zone and a closable outlet for a product, sequentially communicated in this order, the heating zone comprising a graphite cylinder, electrically indirect heating means for heating the starting materials, and a heat insulating layer composed essentially of fine powders selected from the group consisting of graphite, carbonaceous materials, and mixtures thereof, said insualting layer being arranged on the outside of at least the heating zone, wherein a horizontal inner cross-sectional area of the preheating zone is at least about 1.4 times larger than a horizontal inner cross sectional area of the heating zone.

2. An apparatus as defined in claim 1, wherein a horizontal inner cross-section of the preheating zone is a circular, tetragonal or elliptical form.

3. An apparatus as defined in claim 1, wherein the horizontal inner cross-sectional area of the preheating zone is about 2.0–20 times of that of the heating zone at any level above the arbitrary position of the preheating zone.

4. An apparatus as defined in claim 1, wherein a height of the arbitrary positon of the preheating zone is not more than about 0.6 m from an upper end of the heating zone.

5. An apparatus as defined in claim 4, wherein the height of the arbitrary position of the preheating zone is within a range of about 0.1–0.4 m.

6. An apparatus as defined in claim 1, wherein the horizontal inner cross-sectional area below the arbitrary position of the preheating zone varies stepwise and/or continuously.

7. An apparatus as defined in claim 1, wherein an effective heating width at the heating zone is selected within a range of about 0.10–0.35 m.

8. An apparatus as defined in claim 1, wherein the heat insulating layer has a thickness of about 0.1–1.5 m in horizontal direction.

9. An apparatus as defined in claim 1, wherein said electrically indirect heating means for heating the starting materials is adapted to heat said materials at a controlled temperature of within a range of about 1650–2100° C.

10. An apparatus as defined in claim 1, wherein the heating means consists of an electric resistive heating member and a heat reflection member.

11. An apparatus as defined in claim 10, wherein the heating member is positioned in a space defined by the heating zone and the heat reflection member and filled with a non-oxidizing gas.

12. An apparatus as defined in claim 10, wherein the heat reflection member is an inner wall of a chamber containing the heat insulating layer.

13. An apparatus as defined in claim 10, wherein a vertical length of heat-generating portion of the heating member is within a range of about 0.3–1.5 m.

* * * * *